(12) United States Patent
Kalthod

(10) Patent No.: US 6,688,477 B2
(45) Date of Patent: Feb. 10, 2004

(54) COMPOSITE MEMBRANES

(75) Inventor: Dilip Gurudath Kalthod, St Louis, MO (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 09/847,897

(22) Filed: May 3, 2001

(65) Prior Publication Data

US 2003/0024881 A1 Feb. 6, 2003

(51) Int. Cl.[7] .............................. C02F 1/44; R29G 65/00
(52) U.S. Cl. ............. 210/490; 210/500.27; 210/500.42; 264/41; 96/4; 427/244
(58) Field of Search ................... 210/490, 500.27, 210/500.42, 640; 95/43, 45; 96/4; 264/41

(56) References Cited

U.S. PATENT DOCUMENTS

| | | | |
|---|---|---|---|
| 3,925,332 A | * | 12/1975 | Naito et al. |
| 4,020,230 A | * | 4/1977 | Mahoney et al. |
| 4,082,658 A | * | 4/1978 | Fritzsche et al. |
| 4,230,463 A | | 10/1980 | Henis et al. |
| 4,311,594 A | * | 1/1982 | Perry |
| 4,472,175 A | | 9/1984 | Malon et al. |
| 4,484,935 A | | 11/1984 | Zampini |
| 4,486,202 A | | 12/1984 | Malon et al. |
| 4,575,385 A | | 3/1986 | Brooks et al. |
| 4,629,563 A | | 12/1986 | Wrasidlo |
| 4,654,055 A | | 3/1987 | Malon et al. |
| 4,704,324 A | * | 11/1987 | Davis et al. |
| 4,728,346 A | | 3/1988 | Murphy |
| 4,756,932 A | | 7/1988 | Puri |
| 4,767,422 A | | 8/1988 | Bikson et al. |
| 4,802,984 A | | 2/1989 | Waite |
| 4,806,189 A | | 2/1989 | Kraus et al. |
| 4,824,443 A | * | 4/1989 | Matson et al. |
| 4,861,628 A | | 8/1989 | Schucker |
| 4,913,816 A | | 4/1990 | Waite |
| 5,075,011 A | | 12/1991 | Waite |
| 5,147,553 A | | 9/1992 | Waite |
| 5,294,342 A | | 3/1994 | Donato |
| 5,356,459 A | | 10/1994 | Bikson et al. |
| 5,385,694 A | | 1/1995 | Wu et al. |
| 5,391,426 A | | 2/1995 | Wu |
| 5,401,410 A | | 3/1995 | Bell et al. |
| 5,445,669 A | | 8/1995 | Nakabayashi et al. |
| 5,460,872 A | | 10/1995 | Wu et al. |
| 5,468,430 A | | 11/1995 | Ekiner et al. |
| 5,514,276 A | | 5/1996 | Babcock et al. |
| 5,520,869 A | | 5/1996 | Taylor |
| 5,525,282 A | | 6/1996 | Dugan |
| 5,538,770 A | | 7/1996 | Bekele |
| 5,580,650 A | | 12/1996 | Forgach et al. |
| 5,582,725 A | | 12/1996 | McCray et al. |
| 5,608,014 A | | 3/1997 | Ekiner |
| 5,611,930 A | * | 3/1997 | Nguyen et al. |
| 5,614,309 A | | 3/1997 | Chung et al. |
| 5,629,084 A | | 5/1997 | Moya |
| 5,635,067 A | | 6/1997 | Macheras |
| 5,693,227 A | | 12/1997 | Costa |
| 5,698,281 A | | 12/1997 | Bellantoni |
| 5,702,503 A | | 12/1997 | Tang |
| 5,726,212 A | * | 3/1998 | Yuk et al. |
| 5,753,009 A | | 5/1998 | Sirkar et al. |
| 6,112,908 A | * | 9/2000 | Michaels |
| 6,440,309 B1 | * | 8/2002 | Cohen |

FOREIGN PATENT DOCUMENTS

| | | |
|---|---|---|
| JP | 5318482 | 2/1978 |
| JP | 594402 | 1/1984 |
| WO | 9503878 | 2/1995 |

* cited by examiner

*Primary Examiner*—Ana Fortuna
(74) *Attorney, Agent, or Firm*—Mark L. Rodgers

(57) ABSTRACT

The present invention provides a composite membrane comprising a porous support layer and a selective layer comprising a vinylacetate polymer. The invention also provides a process for preparing a vinylacetate polymer selective layer on a porous support by depositing a colloidal dispersion having colloid particles of the vinylacetate polymer on the porous support followed by annealing the deposited colloids to form a selective layer. The membranes are useful for separation of gas or liquid or vapor mixtures.

5 Claims, No Drawings

COMPOSITE MEMBRANES

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates to improved membranes for separation of gas or liquid or vapor mixtures. In particular, this invention relates to improved polymeric composite membranes and a process for preparation of the membranes.

BACKGROUND OF THE INVENTION

Gas or vapor or liquid separation via membranes is an established commercial technology with many applications and continues to find acceptance in new applications. Among the applications are: (a) separation of hydrogen from nitrogen, methane, or carbon monoxide in applications such as recovery of ammonia purge gas, oil refining, and synthesis gas manufacture; (b) separation of carbon dioxide and hydrogen sulfide from methane in the upgrading of natural gas; (c) separation of oxygen from nitrogen in the production of nitrogen enriched air or oxygen enriched air; (d) separation of water vapor from compressed air or natural gas to obtain a dry gas; (e) separation of volatile organic compounds (VOC) from air or nitrogen, (f) recovery of fuels from air or nitrogen in transloading operations; (g) recovery of fluorinated hydrocarbons from nitrogen in the manufacture of semiconductors; (h) pervaporative separation of water from liquid alcohol mixtures; and (i) pervaporative separation of trace organic compounds from aqueous streams. In each of these applications, membranes compete with other separation technologies, e.g., absorption in solvents, adsorption in molecular sieves or other adsorbents, distillation or refrigeration. The choice of separation technology employed depends upon a variety of factors, including capital cost of the separation equipment, energy cost per unit volume of gas produced, reliability, maintenance costs, ease and flexibility of operation, and size and weight of the separation equipment.

Useful membranes have a thin dense layer which provides the selectivity or separation characteristics and a porous substructure which provides mechanical support. Membranes used in gas or vapor or liquid separations may function based on one of three general transport mechanisms: (1) solution diffusion, (2) Knudsen diffusion, or (3) selective sieving by molecular size. Polymeric membranes used in commercial product offerings for gas or vapor or pervaporative liquid separation, function almost exclusively based on solution diffusion. Permeation via solution diffusion involves dissolution of a permeating species at one interface of the membrane, diffusion through the polymer membrane, and desorption at the opposite membrane interface. The driving force for permeation through the membrane is the partial pressure difference between the two sides. In pervaporative separation or pervaporation, a liquid mixture contacts one side of the membrane and the permeate is removed as a vapor from the other side.

The primary requirements of a commercial membrane are a high permeation coefficient (also referred to in membrane literature as "p/l" which is defined as the flux of the component per unit of partial pressure difference) for the faster permeating species, high selectivity (i.e., ratio of the permeation coefficient for the faster permeating species to the permeation coefficient for the slower permeating species), stability under the operating feed pressure and temperature, and tolerance to feed stream components and contaminants. Of these, the first two requirements appear to be diametrically opposed to each other because of the inverse relationship of the permeability of a polymer and the selectivity of that polymer for a given set of permeating species. For instance, usually, the more permeable the polymer, the lower its selectivity. This problem can be solved by applying a polymer of adequate selectivity as a coating or laminate to a support to prepare a thin composite membrane which simultaneously realizes a high permeation coefficient and a high selectivity.

Integrally skinned asymmetric membranes represent one class of commercial membranes with thin selective layers. The thin selective layer or skin and the substructure of an integrally skinned, asymmetric membrane are made of the same polymer in a single process. Their inherent limitation is that the permeation properties are derived from the support polymer, and there is a limited number of polymers from which integrally skinned, asymmetric membranes can be produced economically.

Composite membranes represent another class of thin polymer membranes. The selective layer and substructure of composite membranes are made of different polymers, usually in two or more separate process steps. Composite membranes are especially attractive when the selective layer polymer is expensive or lacks adequate mechanical properties to be a useful support. In such composite membranes, the porous support provides the mechanical strength while offering low resistance to transport of the gas or vapor. It is necessary that the surface pores of the porous support be sufficiently small that the thin selective layer bridging the mouths of the pores has adequate burst strength. Composite membranes overcome the inherent limitations of integrally skinned asymmetric membranes so that a wide range of materials can be used for the selective layer. Thus the properties of composite membranes can be tailored to particular applications.

Membranes provide an alternative to desiccant and refrigerant dehydrators used for compressed air drying and to glycol absorption or molecular sieve or deliquescent dehydrators used in natural gas drying. In order to be competitive with conventional technology, the membrane needs to possess a high permeation coefficient for water and high selectivity relative to the other components of the gas mixture. In addition, the membrane should be stable in contact with the feed components and contaminants under operating conditions.

Several methods for the preparation of membranes for dehydration have been described in the literature. One method involves coating a porous support with a solution of a polymer in a solvent mixture. The resulting separating layer may contain a single polymer or a blend of several materials, or multiple coatings with dissimilar polymers. Examples are U.S. Pat. Nos. 4,981,498 and 5,067,971 to Bikson et al. which describe a composite membrane for the dehydration of gases prepared by coating a porous support with a thin layer of a sulfonated polysulfone.

Interfacial polymerization has been used to form the selective layer directly on the porous support by reacting two immiscible reagents (e.g., polyamine in water with diacid chloride in an immiscible organic solvent) from which a cross-linked polymer film is formed on or in the support at the interface of the two reagents, as illustrated in U.S. Pat. No. 5,002,590 to Friesen et al.

As described above, many attempts have been made to provide composite membranes with both high permeation rates and high selectivity. The porous supports used in these membranes are desirably porous to provide low resistance to transport of gas or vapor species and still provide adequate mechanical support to a selective layer.

Permeation of species through a selective layer and the surface pores of the support has been described by a mathematical model (see Keller and Stein, J. Mathematical Biosciences, 1, 421–437, 1967). This type of model illustrates that not all the surface of the selective layer permits permeation; the fractional effective area for permeation increases as the surface porosity (void area fraction) of the support increases and the diameter of the surface pores decreases. Hence, high surface porosity values and small surface pore sizes are desirable in a porous support. In addition, smaller pore sizes provide better mechanical support to the thin selective layer thus preventing the rupture of the thin layer under operating conditions of pressure and temperature.

One of the problems in the preparation of composite membranes, especially when coating from a solution of the polymer in a solvent system, involves penetration of the polymer coating into the pores of the support. Penetration, even to a minute extent, can severely reduce the permeation rate through the membrane. This has been demonstrated via mathematical models of permeation through composite structures (see Lopez et al., J. Membrane Science, 27, 301–325, 1986). During coating with polymer solutions, among other factors, the extent of penetration of the coating solution into the support depends upon the molecular weight of the polymer and its concentration in the solution. High molecular weight and high concentration of the polymer in solution are desirable to reduce the extent of penetration; however, these factors also result in thicker coated layers and hence lower permeation rates. Smaller surface pore sizes are desirable to reduce penetration into the porous support. However, typical preparation techniques for porous supports result in lower surface porosity as the surface pore size is decreased; this tends to result in a decrease in the permeation rate through the composite membrane.

In light of the above, there exists a need for further improvement in the preparation of composite membranes particularly suitable for dehydration of gases or liquids. This is especially true for overcoming the problem of excessive penetration by the selective layer into a porous support layer when the support layer high surface porosity. In addition, it is necessary to have a manufacturing process which is simple and low in cost.

SUMMARY OF THE INVENTION

The present invention provides a composite membrane for separation of gas or vapor or liquid mixtures. The composite membrane of the present invention comprises a porous support provided with a selective layer comprised of a vinylacetate polymer.

For the purpose of defining terminology used herein, the vinylacetate polymer may be a vinylacetate homopolymer or a vinylacetate copolymer. Homopolymer generally refers to a polymer made from essentially one monomer. Copolymer refers to a polymer made from two or more monomers. Classes of copolymers include random alternating, block, or graft copolymers. Examples of suitable monomers which may be used to make the vinylacetate copolymers of the present invention include the following: vinyls such as vinylacetate, vinyl chloride, vinylidene chloride, alkyl vinyl ether, halogenated alkyl vinyl ether; acrylonitriles such as acrylonitrile methacrylonitrile; alkenes, such as ethylene, propylene, 4-methyl 1-pentene, butadiene, and the like; halogenated alkenes such as, tetrafluoroethylene, hexafluoropropylene, vinylidene fluoride; acrylates such as alkyl acrylates, halogenated alkyl acrylates; methacrylates such as alkyl methacrylates, halogenated alkyl methacrylates; acrylamides; styrene and substituted styrenes such as styrene, methylstyrene, halogenated styrene; and allyl compounds such as allyl acetate, allyl chloride, and allyl bromide.

The composite membrane of the present invention is prepared by coating a porous support with a colloidal dispersion or emulsion or suspension (hereafter referred to as a colloidal dispersion) of a vinylacetate polymer, preferably followed by heat treatment to provide a selective layer. The vinylacetate polymer layer provides a high permeation coefficient and selectivity for certain components versus the other components of a gas or liquid or vapor mixture.

The membranes of the present invention may be flat sheets or hollow fibers or any other suitable membrane configuration.

The present invention also provides a process for preparation of a vinylacetate polymer composite membrane by contacting a surface of a porous support with a colloidal dispersion or emulsion or suspension of a vinylacetate polymer, preferably in an aqueous medium. After contact with the colloidal dispersion, the support preferably is subjected to heat treatment, or other suitable treatment, to cause coalescence of the colloidal particles and formation of a substantially continuous thin layer.

DETAILED DESCRIPTION OF THE INVENTION

Colloidal dispersions or emulsions or suspensions are generally systems of particles dispersed in a continuous liquid phase and are characterized by slow diffusion and slow sedimentation of the dispersed particles under normal gravity, the dispersed particles generally having a size in the range of about 10 to about 10,000 Angstroms diameter. Lyophobic colloidal dispersions contain particles which are insoluble in the continuous liquid phase and may require the presence of a stabilizing substance for their preparation. The stability (i.e., a long shelf life) of such colloidal dispersions requires that the particles repel each other, for example, by carrying a net electrostatic charge or by being coated with a sufficiently thick layer of large molecules compatible with the liquid phase (J. Th. G. Overbeek, Colloidal Dispersions, Royal Society of Chemistry, 1981). The polymers of the selective layer of the composite membranes of the present invention, are provided by lyophobic polymer colloidal dispersions comprising particles dispersed in a suitable liquid, preferably water.

Polymer colloidal dispersions can be prepared by the following processes: emulsion polymerization, dispersion polymerization, or suspension polymerization. Molecular weight can be controlled by initiator concentration, temperature control, or the addition of chain transfer agents which reduce molecular weight (D. J. Walbridge, Solid/Liquid Dispersions, Academic Press, 1987; J. Langley, Technological Applications of Dispersions, Dekker, 1994). Particle size can be controlled by the presence of and the concentration of an ionic surfactant and/or a non-ionic surfactant. Fine microemulsions can be obtained from the above processes.

Another method of preparing polymer colloidal dispersions involves mixing a dilute solution of the polymer and suitable surface active agents (or surfactants) in a suitable solvent under high shear with suitable non-solvent (for the polymer). A stable colloidal emulsion is formed if the concentrations of the components are properly selected, particularly the concentration of the polymer and the concentrations of the surfactants.

Polymer colloidal dispersions can also be prepared by mechanical means, e.g., crushing, abrading, grinding, centrifugal force in colloid mills, and ultrasonic methods.

The colloidal polymer dispersion may be monodisperse or polydisperse with respect to particle size. The particle diameter distribution should be such that minimal penetration of the colloidal particles into the surface pores of the porous support occurs because too large a degree of penetration will result in a composite membrane which has a low permeation coefficient. However, a small degreed of penetration is preferred to "anchor" the selective layer coating onto the porous support.

The porous supports preferably are prepared from polymer dopes by thermal or phase inversion processes or by other suitable means. The wall of the porous support may have a microporous structure, or it may have macropores with lower porosity at the inside and/or outside surfaces. It is preferred that the porous supports have a much higher surface porosity than typical integrally skinned asymmetric membranes.

Examples of suitable polymers for the porous support are polysulfones, polyethersulfones, polyimides, polyethermides, polyamides, polyamideimides, polyacrylonitrile, polycarbonate, polyarylate, cellulose acetate, polypropylene, and poly(4-methyl 1-pentene).

The selective layer polymer comprises vinylacetate homopolymer, or copolymers of vinylacetate with one or more monomers. Examples of suitable monomers are:

vinyls: vinyl chloride, vinylidene chloride, alkyl vinyl ether, halogenated alkyl vinyl ether, and the like, acrylonitriles: acrylonitrile, methacrylonitrile, and the like, alkenes: hydrocarbons, fluorocarbons, chlorocarbons, or bromocarbons, such as ethylene, propylene, 4-methyl 1-pentene, butadiene and the like.

halogenated alkenes: tetrafluoroethylene, hexafluoropropylene, vinylidene fluoride and the like, acrylates: alkyl acrylates, halogenated alkyl acrylates, and the like, methacrylates: alkyl methacrylates, halogenated alkyl methacrylates, and the like, acrylamides and the like, styrene and substituted styrenes: styrene, methylstyrene, halogenated styrene, and the like, allyl compounds: allyl acetate, allyl chloride, allyl bromide, and the like.

Particular examples of polymers and copolymers of interest in the present invention include polyvinylacetate homopolymer, vinylacetate-ethylene copolymer, vinylacetate-acrylic copolymer, or vinylacetate-acrylonitrile copolymer.

The polymer colloidal dispersions are deposited on the surface of the porous support by contact with a dispersion of selected vinylacetate polymer particles in a suitable liquid followed by draining the excess dispersion. Hollow fiber porous supports may be coated on either the inside or outside surface utilizing the above process. A pressure may be applied to the dispersion to assist deposition of the solid particles and to compact the deposited layer. Upon evaporation of the continuous phase liquid (e.g., water) the colloidal particles come into close contact, and deform if the temperature is above the minimum film formation temperature. If the temperature is sufficiently high, further gradual coalescence occurs as the polymer in the particles fuses to form a continuous selective layer, in a process which is also called "annealing". Cosolvents, if present during the drying and layer annealing process, assist formation of a continuous layer.

The colloidal particles may be "cross-linkable". For example, they may have reactive groups which undergo cross-linking via chemical reaction forming covalent linkages, or hydrogen-bonding, or ionic or dipolar interactions, during the process of selective layer formation resulting in formation of a tough and more durable selective layer with improved stability in contact with feed components and contaminants under the operating conditions. Examples of cross-linking groups include hydroxyl, carboxyl, acrylic, epoxy or other groups that undergo cross-linking reactions with or without the presence of an initiator or catalyst during or after the drying process. If the polymer does not contain reactive groups, cross-linking agents, such as monomers and initiators, may be added to the colloidal dispersion to allow cross-linking reactions to occur during or after formation of the selective layer.

The addition of surfactants in the polymer colloidal dispersion may help in the wetting and spreading processes that occur during deposition of the colloidal particles on the surface of the porous support. However, the presence of certain surfactants or excessive amounts of surfactant in the selective layer coating may cause a reduction in the permeation coefficient or selectivity of the composite membrane. Hence, the selection of a surfactant and its concentration should be optimized to produce a dispersion which allows adequate deposition of the colloidal particles and also results in a selective layer coating with desirably high permeation coefficient and selectivity.

The polymer colloidal particles are deposited on the surface of the porous support utilizing the action of attractive forces such as Van der Waals forces, hydrogen bonding forces, and other forces active in chemisorption of molecules onto a surface. These forces also assist the adherence of the final selective layer coating to the support. If necessary, the surface of the porous support is pretreated by any suitable method to increase its surface energy to enhance deposition of the dispersion and provide good adherence of the final selective layer coating.

After coating with the polymer colloidal dispersion and drying or annealing the coating, the membrane preferably is "repair coated" with a solution of silicone in a volatile solvent (e.g., a hydrocarbon, such as isopentane) using the process of U. S. Pat. No. 4,203,463 to Henis et al. Optionally, the silicone solution is applied to the coated surface with a vacuum applied to the opposite side of the membrane.

The coatings of this invention applied to the porous supports via deposition of polymer colloidal dispersion and selective layer formation are expected to provide selective layers which are non-porous, and hence, the composite membranes thus prepared are expected to be useful in separation of gas or vapor or liquid mixtures. The membranes thus formed have advantages over integrally skinned asymmetric membranes in gas and vapor or liquid separation applications, the membranes of the invention exhibiting (a) higher permeation coefficient for the faster permeating species, (b) lower permeation coefficient for the slower permeating species, (c) higher selectivity for the faster species relative to the slower species, (d) reduced degradation of separation characteristics under operating conditions, and (e) improved stability in contact with the components and contaminants of the feed stream.

The thickness of the selective layer coating deposited on the surface of the porous support is influenced by many factors, among which are (a) concentration of polymer particles in the dispersion, (b) concentration and type of surface active agents present, (c) pH of the dispersion, (d) temperature, and (e) net pressure applied across the porous support during contact with the dispersion.

The composite membrane preferably has a thin selective layer coating on the surface of the porous support in order to allow a high permeation coefficient. However, the selective layer coating should be sufficiently thick to withstand the pressure difference across the membrane during operation of the separation process.

The preferred thickness of the selective layer coating is the lowest value that provides stable permeation coefficients at the operating conditions. At a minimum, the coating thickness should be sufficient to avoid rupture or collapse of the membrane at the operating pressure and temperature.

The following examples are by way of illustration only and are not intended to limit the scope of the invention.

EXAMPLE 1

Test modules are assembled from polysulfone porous support fiber with a highly asymmetric structure. The porous support fiber has large pores at the outer edge, macrovoids in the wall, and a dense structure with small pores at the inner edge. The fiber has an outer diameter of 1900 microns and bore diameter of 1100 microns. The fiber has a molecular weight cut-off (MWCO) rating of 1000 in ultrafiltration. The MWCO rating is the molecular weight of a solute that is retained by the membrane to the extent of 80%–90% in a standardized test; solutes of higher molecular weight are retained to a greater extent, whereas solutes of lower molecular weight permeate through the membrane. As MWCO increases, the diameter of the smallest pores, which are usually located at the surface, increases. Each test module contains 5 fibers of about 12 cm length or an active area of about 21 cm$^2$ (based on the bore diameter).

The fiber surfaces of the above test modules are coated with an aqueous dispersion of an emulsion polymer. Emulsion polymers are prepared as colloidal dispersions by emulsion or dispersion polymerization. The following emulsion polymers are used:

TABLE 1

| Emulsion Polymer | Trade Name | $T_g$ °C. | Average particle size micron | pH |
|---|---|---|---|---|
| Vinylacetate-ethylene | Airflex ® 7200 | 0 | 0.15 | 4.0–5.5 |
| Urethane-acrylic | Flexthane ® 610 | N/A | <0.06 | 7.5–8.5 |

The emulsion polymers, identified as AIRFLEX 7200 and FLEXTHANE 610 are commercially available as mixtures containing 30–70% solids with added stabilizers. The emulsion polymers used in this example are manufactured by Air Products and Chemicals, Inc. (APCI) of Allentown, Pa. The glass transition temperature ($T_g$) is the approximate midpoint of the temperature range over which a material undergoes a phase change from brittle (glassy) to rubbery or vice versa. As the material is heated above its $T_g$, it is transformed from glassy to rubbery with a concomitant drop in tensile strength. The $T_g$ can be lowered by the addition of plasticizers or co-solvents. Film formation is improved if the material is above its $T_g$; however, the film strength is lowered. The addition of a co-solvent, which evaporates slowly and is completely removed from the film, helps form a uniform film without any reduction in tensile strength.

A coating formulation is prepared by diluting the emulsion polymer to 5% solids with water and adding 5% n-methyl-pyrrolidinone (NMP) to the mixture. The NMP is a co-solvent which improves the wetting of the porous support by the coating formulation. Also because of its higher boiling point (relative to water), as the water evaporates, it is retained in the deposited solids and evaporates slowly, thus partly dissolving the particles. This facilitates formation of a uniform continuous coated layer upon drying and heating. Other partially or completely water miscible organic solvents of higher boiling point relative to water, such as ethylene or propylene glycol ethers, may be used in place of NMP.

The porous support fibers in the test modules are exposed to the coating formulation by flowing the formulation through the bores of the fibers. The fibers are then drained by gravity and dried in an oven at 60° C. for 16 hours. The composite membrane thus produced has a selective layer coating of the polymer on the bore surface of the porous support fiber. The coating may have small defects or discontinuities in it. Such defects allow molecules to by-pass the coated layer and hence reduce its selectivity for separations. These defects can be repaired by exposing the coated layer to a solution of a silicone polymer in a volatile solvent, while optionally applying a vacuum on the opposite side of the membrane wall, as described in U.S. Pat. No. 4,230,463. This repair process plugs the defects in the coated layer and increases the selectivity of the composite membrane. Further, the high permeability of silicone ensures that any silicone deposited on the surface of the selective layer does not cause a significant decrease in the overall permeation coefficient. A solution of 1% heat-curable silicone rubber in isopentane (Dow Sylgard®) is used in the repair process of the present example. The test modules are held in an oven at 50° C. to effect curing of the Sylgard.

The test modules are then tested with wet air fed on the bore side of the hollow fibers at 50 psig to measure permeation of water versus air. The results are shown below in Table 2. The symbol "k" represents the permeation coefficient (also referred to as P/l in membrane literature) of the composite membrane in GPU (Gas Permeation Unit) based on the bore diameter of the fiber where GPU=10$^{-6}$ cm$^3$ (@0° C., 1 atm)/sec/cm$^2$/cm Hg.

TABLE 2

| Emulsion Polymer | k H$_2$O GPU | k Air GPU | H$_2$O/Air Selectivity |
|---|---|---|---|
| Vinylacetate-ethylene | 5240 | 2.93 | 1788 |
| Urethane-acrylic | 1484 | 79 | 18.8 |

It is noted that the vinylacetate-ethylene copolymer produces the higher permeation coefficient for water and the higher selectivity versus air compared to coating with the urethane-acrylic polymer.

For comparison, an integrally skinned, asymmetric polysulfone fiber produces a k $H_2O$ of 1200, k Air of 13, and $H_2O$/Air selectivity of 92. Coatings of vinylacetate-ethylene copolymer on the porous support produce composite membranes with superior permeation properties.

EXAMPLE 2

Test modules are assembled from the polysulfone porous support fiber of Example 1. Each module is coated on the bore surface with vinylacetate-ethylene copolymer emulsion using a coating formulation prepared by diluting the emulsion polymer to 5% solids with water and adding 5% n-methyl-pyrrolidinone (NMP) to the mixture, as in Example 1. The coating is dried and annealed by placing the modules in an oven at 60° C. for 16 hours. Each module is repair coated with Sylgard in isopentane solution as described in Example 1. Two different vinylacetate-ethylene copolymer emulsions from Air Products and Chemicals, Inc. (APCI) presented in Table 3 are used for coating. The APCI trade name for each polymer, and its properties (quoted from vendor literature) are listed in Table 3 below.

TABLE 3

| Vinylacetate-ethylene Copolymer emulsion | $T_g$ ° C. | Stabilizer | Properties |
|---|---|---|---|
| Airflex 7200 | 0 | Polyvinyl alcohol | Superior wet tack |
| Airflex ® 421 | 0 | Surfactant | Self-cross-linking, excellent wet strength and solvent resistance |

The test modules containing the composite membrane are then tested with wet air fed on the bore side at 50 psig to measure permeation of water versus air. The results are shown below in Table 4.

TABLE 4

| Emulsion Polymer | k $H_2O$ GPU | k Air GPU | $H_2O$/Air Selectivity |
|---|---|---|---|
| Airflex 7200 | 5380 | 2.93 | 1836 |
| Airflex 421 | 4900 | 2.93 | 1670 |

It is noted that Airflex 7200 and Airflex 421 vinylacetate-ethylene copolymer emulsions produce composite membranes of similar properties. The self cross-linking property of the Airflex 421 emulsion is expected to result in a coated layer with improved mechanical properties and solvent resistance; hence this type of emulsion is desirable for production of composite membranes.

EXAMPLE 3

Test modules are assembled from two different polysulfone porous support fibers of the same general type as in Example 1. The two fibers have different MWCO (molecular weight cut-off) ratings of 1000 and 50,000 in ultrafiltration. Each test module contains 5 fibers of about 12 cm in length or an active area of about 21 cm$^2$ (based on the bore diameter).

The porous support fiber of each module is coated on the bore surface with Airflex 421 vinylacetate-ethylene copolymer using a coating formulation prepared by diluting the emulsion polymer to 5% solids with water and adding 5% n-methyl-pyrrolidinone (NMP) to the mixture, as in Example 1. The coating is dried and annealed by placing the modules in an oven at 60° C. for 16 hours. Each module is repaired with a coating of Sylgard in isopentane solution as described in Example 1. The test modules containing the composite membrane are then tested with wet air fed on the bore side at 50–100 psig to measure permeation of water versus air. The modules are also tested with dry nitrogen on the bore side. The results are shown below in Table 5.

TABLE 5

| MWCO rating of porous support | k $H_2O$ GPU | k $N_2$ GPU | $H_2O/N_2$ Selectivity |
|---|---|---|---|
| 1,000 | 4900 | 0.98 | 5000 |
| 50,000 | 3220 | 0 | ∞ |

The results indicate that the porous support of higher porosity (MWCO of 50,000) produces a somewhat lower permeation coefficient for water but a substantially higher selectivity for water relative to nitrogen.

EXAMPLE 4

Porous support fiber spun from polysulfone (Udel®, Amoco) to produce an asymmetric structure with narrow pores in the outer layer, a spongy microporous wall, and porous inner edge, is coated on the outside using a formulation of vinylacetate-ethylene copolymer. The fiber has an outer diameter of 345 microns and a bore diameter of 195 microns. The coating formulation is prepared by diluting Airflex 7200 emulsion polymer to 5% solids with water. Coating is accomplished by dipping individual fibers with the lower end closed into the formulation and allowing the dipped fibers to dry at ambient temperature for 3 hours.

The coated surface has residual tack because of the deposited vinylacetate-ethylene polymer. The tack is undesirable because it causes the fibers to adhere to each other. The tack is neutralized by a second coating with a formulation containing 5% urethane-acrylic copolymer emulsion (Flexthane 610) in water. The coating is applied as described above.

A test module is assembled from 22 fibers coated as above, of about 12 cm active length. The coating is further dried and annealed by placing the module in an oven at 60° C. for 16 hours. The coated layer on the outside of the fiber is subjected to repair coating by filling the shell side of the module with a solution of Sylgard in isopentane; vacuum is not applied to the bore side. The Sylgard is cured by placing the module in an oven at 50° C. The module containing the composite membrane is tested with wet air at 50 psig on the shell side. The permeation coefficients are 3135 GPU for water and 2.36 for air with a water/air selectivity of 1328; hence a desirable combination of high permeation coefficient and selectivity are obtained in the composite membrane.

EXAMPLE 5

Test modules are assembled from polysulfone porous support fiber similar to that in Example 4 but with narrow pores at the bore surface. The outer diameter of the fiber is 740 microns and the bore diameter is 525 microns. Each module contains 5 fibers with 12 cm of active length. The modules are coated by contacting the bores of the fibers with a coating formulation containing 2.5% vinylacetate-ethylene polymer.

The coating formulation is prepared by diluting Airflex 421 emulsion polymer with water. Any liquid held in the bores by capillary tension is removed ("blown down") by subjecting the top of the module (in vertical position) to air pressure at 0.10 psig. The upstream pressure of the gas used to "blow down" the module is increased in small increments until the excess liquid is expelled from the bores. If excessive pressure is used during this step, the coating applied to the bore side surface can be damaged. The coating is dried and annealed by placing the modules in an oven at 60° C. for 16 hours. In the final step, the coating is repaired by exposing the bore surface to a 1% solution of Sylgard in isopentane (without vacuum applied to the shell side), followed by drying in an oven at 50° C. for 16 hours. The modules are tested with different gases (wet air, nitrogen, helium, and carbon dioxide), at 100 psig fed on the bore side to measure the permeation coefficients for various species. The results are shown below in Table 6.

TABLE 6

| Module # | k $H_2O$ GPU | k $N_2$ GPU | k He GPU | k $CO_2$ GPU |
|---|---|---|---|---|
| 1 | 4370 | 13.4 | 8.5 | 11.1 |
| 2 | 3750 | 16.0 | 17.1 | 15.3 |

For comparison, a typical integrally skinned, asymmetric polysulfone fiber of the type used in $O_2/N_2$ separations when tested in bore side feed separations, produces a k $H_2O$ of 1200, k $N_2$ of 7, k He of 340, and k $CO_2$ of 150 (units of GPU). The selectivities are: $H_2O/N_2$=171, $H_2O/He$=3.5, and $H_2O/CO_2$=8. It is noted that the composite membrane produced by coating of vinylacetate-ethylene copolymer emulsion on the porous support has superior permeation properties for dehydration of air, $N_2$, He, and $CO_2$: the average k $H_2O$ is 4100, and the selectivities are: $H_2O/N_2$=280, $H_2O/He$=370, and $H_2O/CO_2$=320.

EXAMPLE 6

Test modules are assembled from polysulfone porous support fiber similar to that in Example 4 but with narrow pores on the bore surface. The outer diameter of the fiber is 610 microns and the bore diameter is 360 microns. Each module contains 5 fibers with 12 cm of active length. The modules are coated by contacting the bore side of the porous support fibers with formulations containing vinylacetate polymer.

The coating formulation is prepared by diluting the emulsion polymer with water and adding other components. Any liquid held in the bores by capillary tension is removed by subjecting the top of the module (in vertical position) to air pressure at 0.10 psig. As in Example 5. The coating is dried and annealed by placing the modules in an oven at 60° C. for 16 hours. In the final step, the coating is repaired by exposing the bore surface to a 1% solution of Sylgard or other silicone in isopentane with vacuum applied to the shell-side, followed by drying in an oven at 60° C. for 16 hours. The modules are tested with moist air at 100 psig fed on the bore side to measure the permeation coefficients for water and air. The coating formulations used and the results of the permeation tests are shown in Table 7 below.

TABLE 7

| Coating Formulation | Component Concentrations | Emulsion Polymer | $T_g$, ° C. | k $H_2O$, GPU | k Air, GPU |
|---|---|---|---|---|---|
| 1 | 2.5% Airflex 421, 0.25% PTSA, 0.25% Surfynol ® SEF | Vinylacetate-ethylene | 0 | 6780 | 2.80 |
| 2 | 2.5% Airflex ® 192, 0.25% PTSA, 0.25% Surfynol SEF | Vinylacetate-ethylene | 10 | 6550 | 2.95 |
| 3 | 2.5% Airflex 192, 1.5% Texanol ®, 0.0375% PTSA | Vinylacetate-ethylene | 10 | 5500 | 2.4 |
| 4 | 2.5% Vinac ® 884, 1.5% Texanol | Vinylacetate | 35 | 6600 | 2.25 |

Airflex 421, Airflex 192, and Vinac 884 are vinylacetate emulsion polymers from Air Products and Chemicals Inc. Airflex 421 contains a larger weight fraction of ethylene copolymer than Airflex 192; both contain the acrylamide moiety which enables self cross-linking of the vinylacetate-ethylene polymer to occur. Cross-linking of the polymer provides a tough and durable film-like selective layer which provides solvent resistance. Vinac 884 is a vinylacetate homopolymer emulsion from Air Products and Chemicals Inc; it is stabilized with a surfactant and contains no moieties which enable self cross-linking of the vinylacetate-ethylene polymer.

PTSA, i.e., paratoluene sulfonic acid, is a strong acid which catalyzes the cross-linking Airflex 421 or 192.

Surfynol SEF is a non-ionic surfactant from Air Products and Chemicals Inc; it is added to improve the wetting of the porous support.

Texanol is a slow evaporating ester alcohol (normal boiling point 255° C.) and has limited water miscibility (manufactured and sold by Eastman Chemicals, Inc.). Texanol functions as a co-solvent to partly dissolve the emulsion polymer and assists the deposited emulsion polymer particles to form into a film on the porous support without dissolving or damaging the polysulfone porous support. It also acts as a surfactant to provide wetting of the porous support. It evaporates slowly and is completely removed from the coating, thus helping form a uniform coating without any reduction in tensile strength.

After completing the permeation tests with moist air, the above modules are subjected to pressure cycling tests as follows:

The modules are tested with nitrogen gas on the bore side at 20–25° C. The pressure of the nitrogen is increased stepwise from 100 psig to 200 psig to 300 psig and then decreases to 100 psig, while holding at each pressure for at least 20 minutes. The permeate flow rate is measured at each step and used to calculate the permeation coefficient for nitrogen. The increase in permeation coefficient between the initial and final 100 psig test is a measure of the damage caused to the coating by the pressurization to 300 psig. The results of the tests are summarized below in Table 8.

TABLE 8

| Coating Formulation | Increase in k $N_2$ during pressure cycling test, % |
|---|---|
| 1 | 55 |
| 2 | 17 |
| 3 | 14 |
| 4 | 3 |

The results indicate that coating a porous support with a vinylacetate homopolymer produces membranes with the best stability under the test protocol used. As the ethylene content of the vinylacetate-ethylene copolymer is decreased (as reflected in the increasing $T_g$ for these polymers in the sequence Airflex 421, Airflex 192 and Vinac 884), the stability of the coated membrane progressively improves. The increase in $T_g$ of the coating polymer is accompanied by an increase in the tensile strength.

EXAMPLE 7

Test modules containing 1650 fibers of the porous support of Example 6 and measuring 1.42" diameter and 21" active length are coated with the Formulation #1 of Example 6. The coating procedure is similar to that described in Example 6. The coating is dried and annealed by placing the modules in an oven at 60° C. for 16 hours. In the final step, the coating is repaired by exposing the bore surface to a 1% solution of Sylgard with vacuum applied to the shell side, followed by drying in an oven at 60° C. for 16 hours. The modules are tested with moist air at 90–100 psig and room temperature (20–27° C.). The feed air is supplied to the bore side at a high ratio of non-permeate flow rate to permeate flow rate. The data are used to calculate the permeation coefficients for nitrogen (based on the area corresponding to the bore diameter) and the oxygen/nitrogen selectivity, which are shown in Table 9 below.

TABLE 9

| Module # | k $N_2$, GPU | Selectivity $O_2/N_2$ |
| --- | --- | --- |
| 1 | 3.63 | 1.25 |
| 2 | 3.12 | 1.46 |
| 3 | 1.18 | 1.97 |
| 4 | 3.39 | 1.34 |
| 5 | 2.11 | 1.62 |
| 6 | 1.6 | 1.81 |
| 7 | 1.55 | 1.85 |
| 8 | 2.13 | 1.57 |

The mean values are: k $N_2$=2.3, GPU, $O_2/N_2$=1.6. The highest value of $O_2/N_2$ selectivity is 1.97 and the corresponding $H_2O/O_2$ selectivity is about 1400. The amount of oxygen depleted from the feed air during drying to low dew points (as low as −40° C. at pressure) is very small. In other words, the oxygen content of the dry air produced from the modules in operation at pressures of 100 psig or higher is almost the same as that of the feed air. This is an advantage in applications where the dry air may be used for breathing.

For comparison, a conventional integrally skinned, asymmetric polysulfone fiber has $O_2/N_2$ selectivity of 5–6 and $H_2O/O_2$ selectivity of 34. An air dryer assembled from this conventional fiber produces a dry air product stream containing 16–17% $O_2$ when operated under conditions appropriate for drying the feed gas to low dew points. The depletion in the $O_2$ content makes the dry air unsuitable for breathing, and precludes the use of such dryers in particular applications.

EXAMPLE 8

Two modules similar to those of Example 6, and coated with Formulation 1 (2.5% Airflex 421, 0.25% PTSA, 0.25% Surfynol SEF) of Example 6 are subjected to a water exposure challenge test as follows. The modules are first tested with the bore side fed with wet air at 100 psig to measure the values of k $H_2O$ and k Air. This establishes a baseline for the water challenge test. Approximately 25 ml of water is poured through each module through a funnel connected to the top. About 2 hours is needed for the water to drain through the module, thus thoroughly wetting the fibers. After the water is drained out, the bore sides of the water wet modules are connected to wet air at 100 psig, 23–24° C., and a feed flow of about 1 liter/min is maintained through the bore side. The modules are allowed to stand under pressure for 24 hours following which they are retested for k $H_2O$ and k Air. The results are shown in Table 10.

TABLE 10

| Module # | | k $H_2O$, GPU | k Air, GPU |
| --- | --- | --- | --- |
| 1 | Before water challenge | 5740 | 1.77 |
| 1 | After water challenge | 6020 | 1.57 |
| 1 | Change % | +4.9 | −11 |
| 2 | Before water challenge | 6840 | 2.33 |
| 2 | After water challenge | 7100 | 2.28 |
| 2 | Change % | +3.8 | −2.1 |

The results indicate that there is no drop in k $H_2O$, nor any increase in k Air as a result of the water challenge test. In fact, the data indicate a small increase in k $H_2O$, and a small drop in k Air. Similar results are expected for other vinylacetate homopolymer and copolymer coated membranes. The stability of the separation properties of the membrane is a useful characteristic when operating under adverse conditions wherein the membrane may be exposed to deposition of water droplets entrained in the feed gas stream. The above tests indicate that the membrane will not be damaged by operating it under such adverse conditions.

What is claimed is:

1. A composite membrane suitable for separation of gas or liquid or vapor mixture having a porous support layer with a first surface and opposite thereto a second surface, and a thin selective layer of a vinylacetate-ethylene copolymer affixed to the surface when prepared by a process comprising:
   (a) depositing on the first surface of the porous support a lyophobic colloidal dispersion containing vinylacetate-ethylene copolymer particles, the mean particle size being equal to or more than the mean pore size of the porous support, and
   (b) effecting removal of the liquid constituents of the deposited dispersion to form a thin selective layer on the porous support thus forming a composite membrane.

2. The composite membrane of claim 1 wherein the vinylacetate-ethylene copolymer contains one or more monomers selected from the group consisting of a vinyl monomer, an acrylonitrile monomer, an alkene monomer, a halogenated alkene monomer, an acrylate monomer, a methacrylate monomer, an acrylamide monomer, a styrene monomer and an allyl monomer.

3. The composite membrane of claim 1 wherein the porous support is comprised of a polymer selected from the group consisting of polysulfones, polyethersulfones, polyimides, polyethermides, polyamides, polyamideimides, polyacrylonitrile, polycarbonate, polyarylate, cellulose acetate, polypropylene, and poly(4-methyl 1-pentene).

4. A composite membrane suitable for separation of gas or liquid or vapor mixtures having a porous support layer with a first surface and opposite thereto a second surface, and a thin selective layer of a vinylacetate homopolymer affixed to the first surface when prepared by a process comprising:

(a) depositing on the first surface of the porous support a lyophobic colloidal dispersion containing vinylacetate homopolymer particles, the mean particle size being equal to or more than the mean pore size of the porous support, and (b) effecting removal of the liquid consituents of the deposited dispersion to form a thin selective layer on the porous support thus forming a composite membrane.

5. The composite membrane of claim 4 wherein the porous support is comprised of a polymer selected from the group consisting of polysulfones, polyethersulfones, polyimides, polyethermides, polyamides, polyamideimides, polyacrylonitrile, polycarbonate, polyarylate, cellulose acetate, polypropylene, and poly(4-methyl 1-pentene).

* * * * *

UNITED STATES PATENT AND TRADEMARK OFFICE
CERTIFICATE OF CORRECTION

PATENT NO.    : 6,688,477 B2
DATED         : February 10, 2004
INVENTOR(S)   : Dilip Gurudath Kalthod It is certified that error appears in the above-identified patent and that said Letters Patent is hereby corrected as shown below:

Column 14,
Line 39, insert the word -- first -- after the word "the".

Signed and Sealed this

Twenty-seventh Day of April, 2004

JON W. DUDAS
*Acting Director of the United States Patent and Trademark Office*